United States Patent
Boesel et al.

(10) Patent No.: US 9,889,725 B2
(45) Date of Patent: Feb. 13, 2018

(54) TRUCK CAP HANDLE AND LOCK ASSEMBLY

(71) Applicant: VSI, LLC, Green Bay, WI (US)

(72) Inventors: Lucas Boesel, Muskego, WI (US); Joshua J. Miller, Brookfield, WI (US)

(73) Assignee: VSI, LLC, Green Bay, WI (US)

( * ) Notice: Subject to any disclaimer, the term of this patent is extended or adjusted under 35 U.S.C. 154(b) by 161 days.

(21) Appl. No.: 14/925,277

(22) Filed: Oct. 28, 2015

(65) Prior Publication Data

US 2016/0145911 A1    May 26, 2016

Related U.S. Application Data

(60) Provisional application No. 62/069,498, filed on Oct. 28, 2014.

(51) Int. Cl.

| | |
|---|---|
| *B60J 1/18* | (2006.01) |
| *E05B 85/10* | (2014.01) |
| *E05B 47/06* | (2006.01) |
| *E05B 1/00* | (2006.01) |
| *E05B 13/10* | (2006.01) |
| *E05B 15/00* | (2006.01) |

(52) U.S. Cl.
CPC ......... *B60J 1/1876* (2013.01); *E05B 1/0038* (2013.01); *E05B 13/101* (2013.01); *E05B 47/0676* (2013.01); *E05B 85/10* (2013.01); *E05B 15/006* (2013.01)

(58) Field of Classification Search
CPC .......... E05B 83/16; E05B 83/18; E05B 13/10; E05B 47/06; E05B 47/0676; E05B 85/01; E05B 85/06; E05B 85/10; E05B 15/006; B62D 33/037; B60J 1/18

USPC ....................................... 296/146.16
See application file for complete search history.

(56) References Cited

U.S. PATENT DOCUMENTS

| | | | | |
|---|---|---|---|---|
| 4,015,454 A | * | 4/1977 | Struble | E05C 1/08 |
| | | | | 292/150 |
| 6,076,304 A | * | 6/2000 | Carrier | E05F 11/10 |
| | | | | 49/336 |

(Continued)

FOREIGN PATENT DOCUMENTS

EP    2466043 A1 *  6/2012    ......... E05B 47/0012

*Primary Examiner* — H Gutman
(74) *Attorney, Agent, or Firm* — Joseph S. Heino; James E. Lowe, Jr.; Erin E. Kaprelian

(57) ABSTRACT

A simplified truck cap handle and lock assembly is provided. Unlike truck cap handle and lock assemblies known in the art, the assembly is comprised of a codeable lock that is disposed in a position that is not perpendicular to the glass access window of the cap. The lock of the present invention is rotated 90° from the perpendicular. Further, the lock is codeable because it is preferably keyed to match other locks and ignition key switch of the vehicle with which the assembly is used. The invention provides a unique locking structure having a number of components that form the assembly. The assembly is easy to use and easy to install in an aftermarket application. Further, the assembly can be easily converted to an electronic actuated version without any retooling of the component parts of the assembly. The assembly provides the user with tactile feedback as to its operation.

17 Claims, 11 Drawing Sheets

(56) References Cited

U.S. PATENT DOCUMENTS

2006/0090527 A1* 5/2006 Terhaar ................ E05B 13/108
                                                       70/208
2012/0103033 A1* 5/2012 Kalous ................ B62D 33/037
                                                       70/101

* cited by examiner

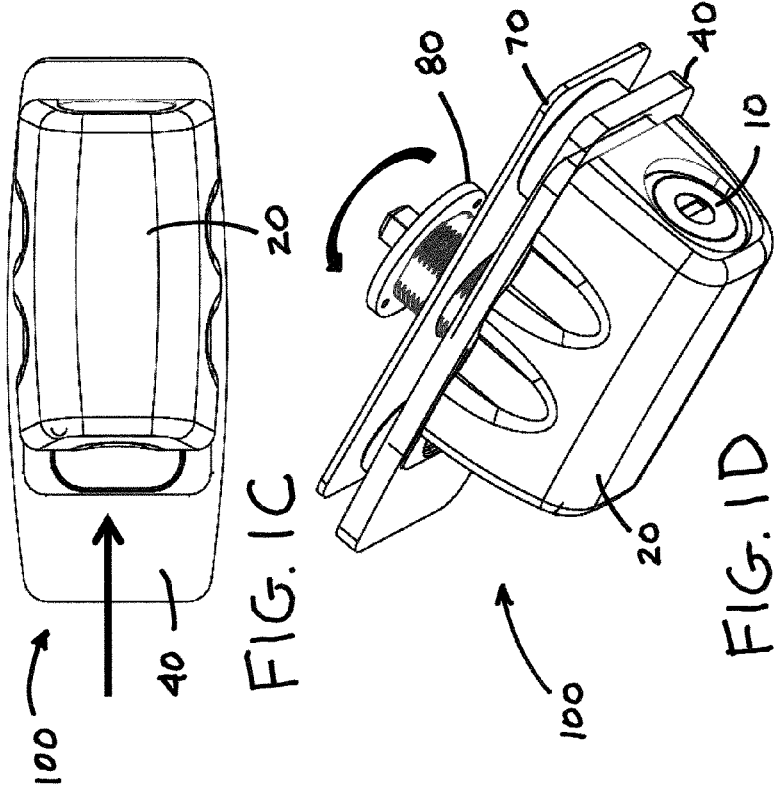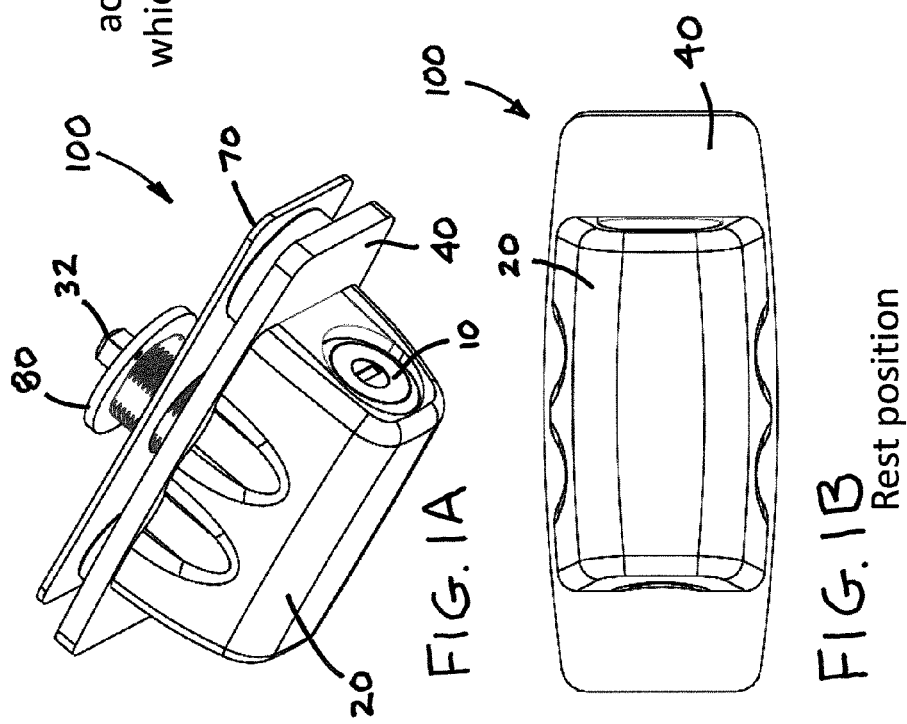

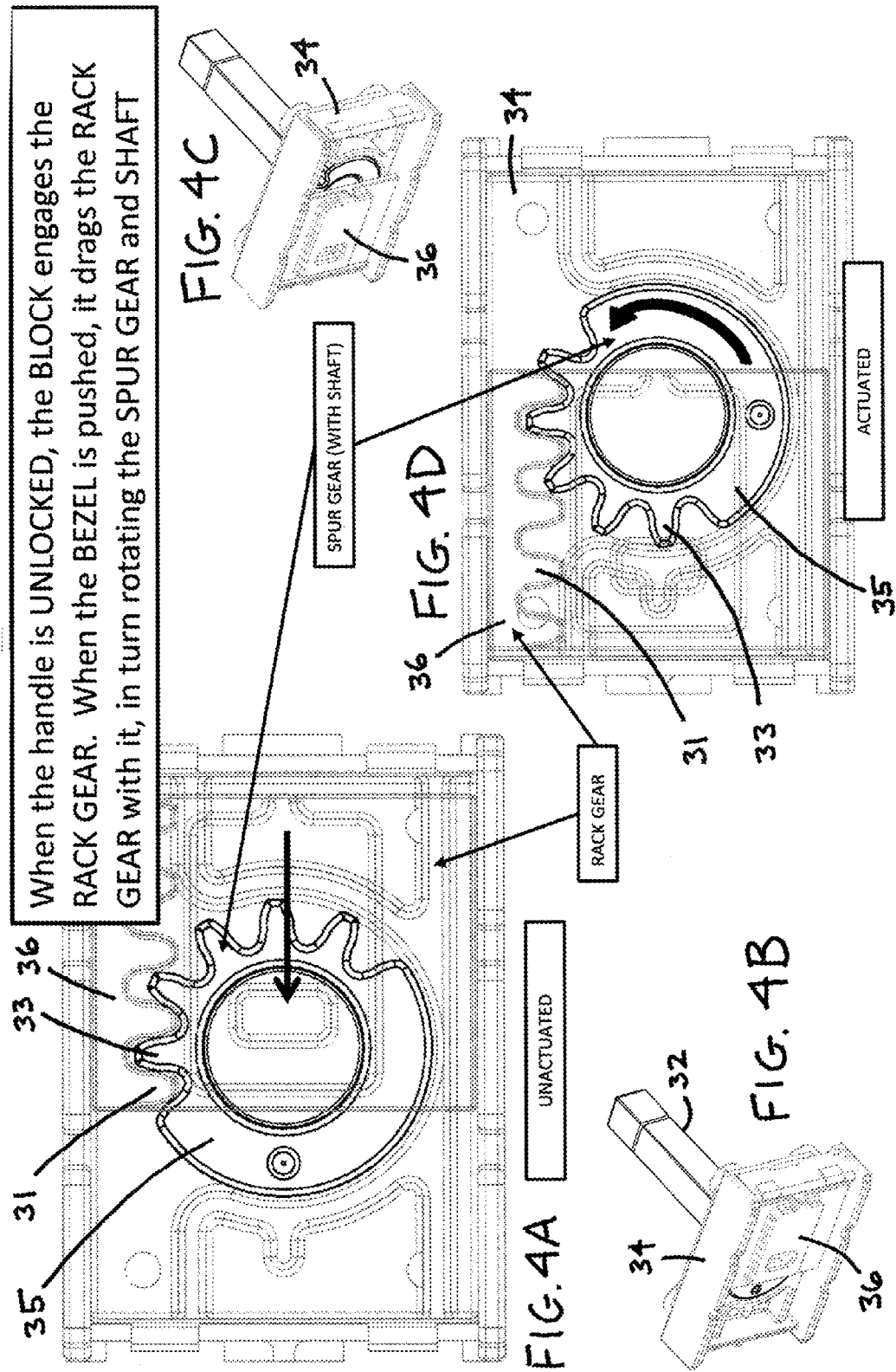

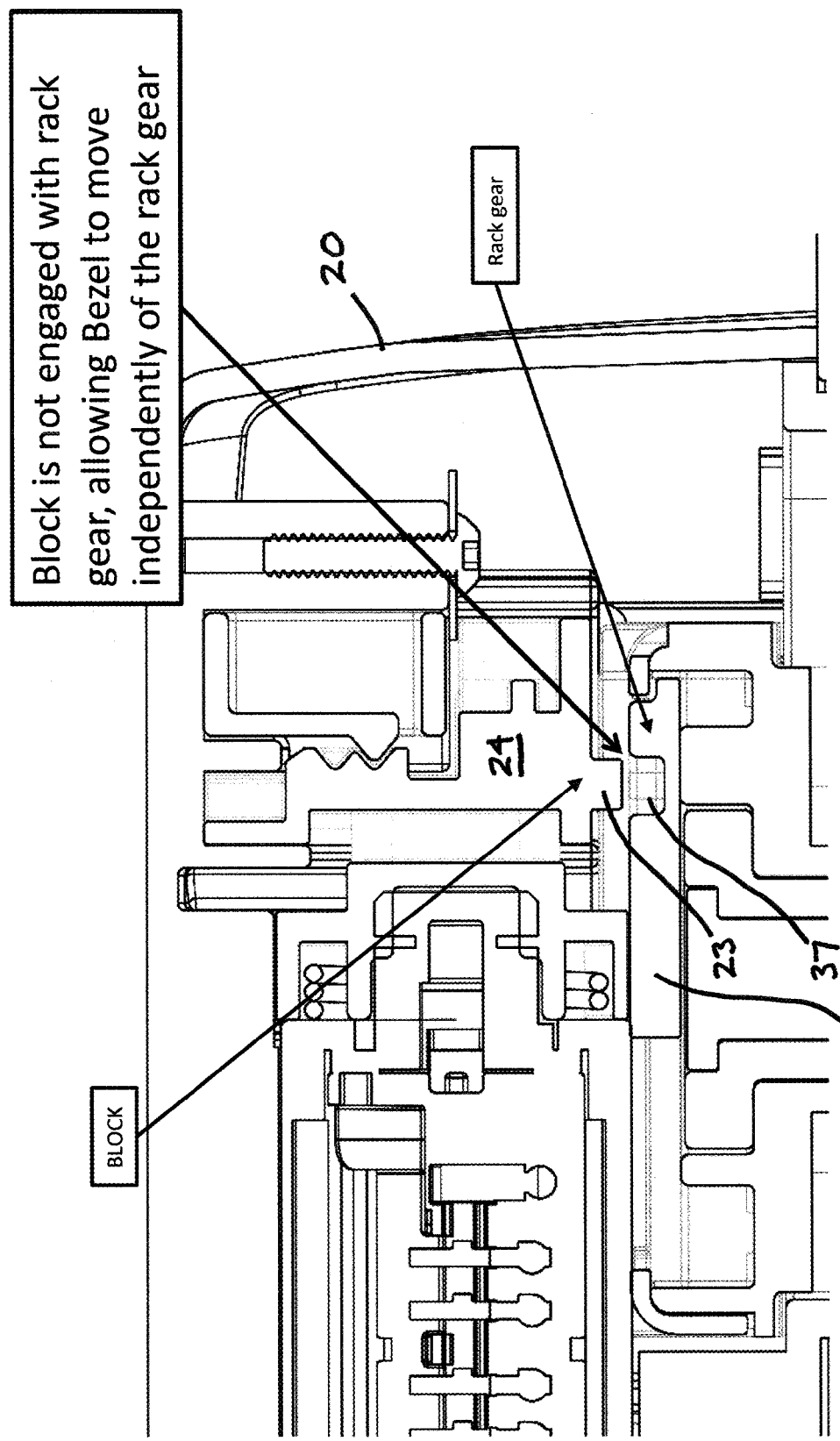

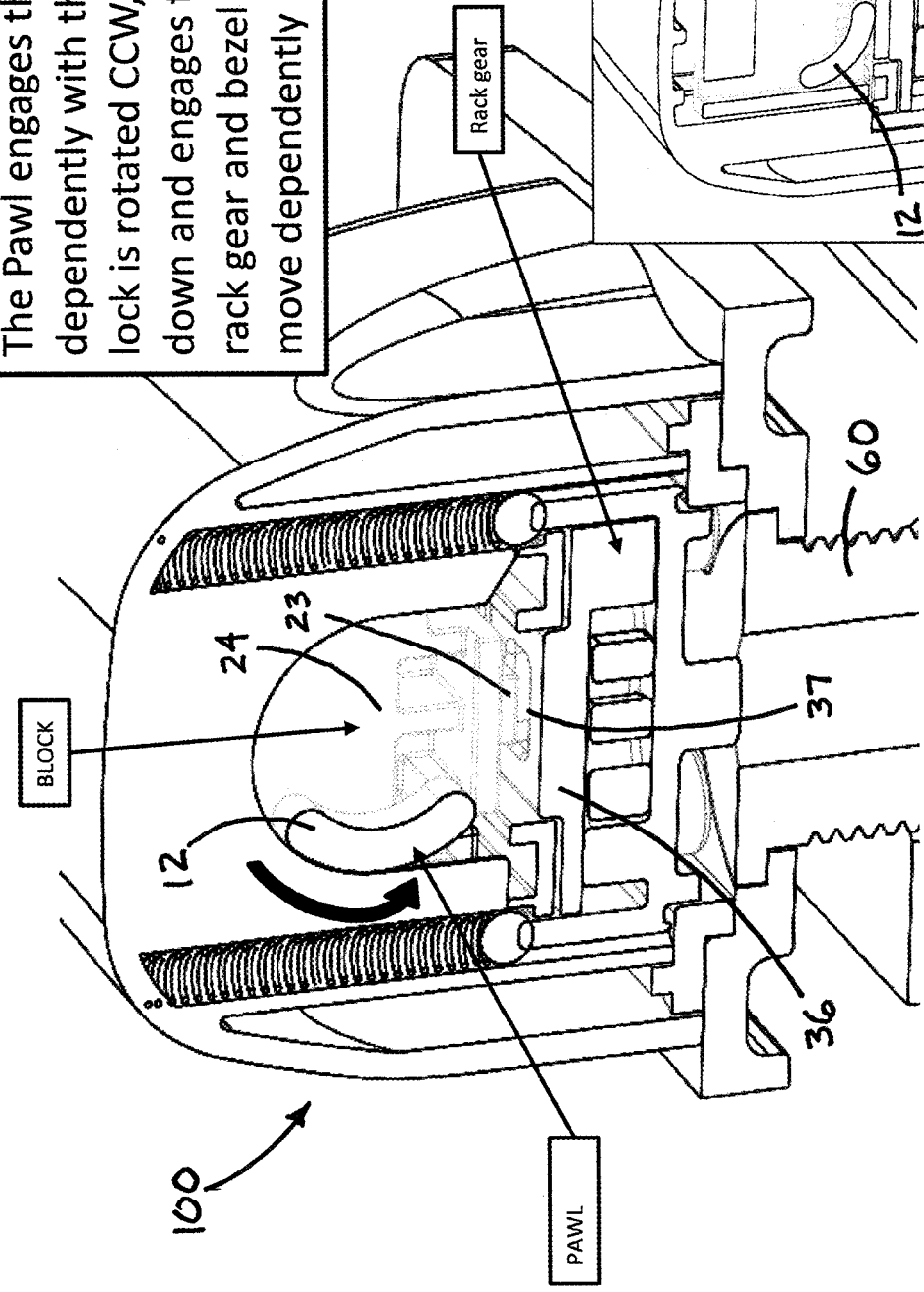

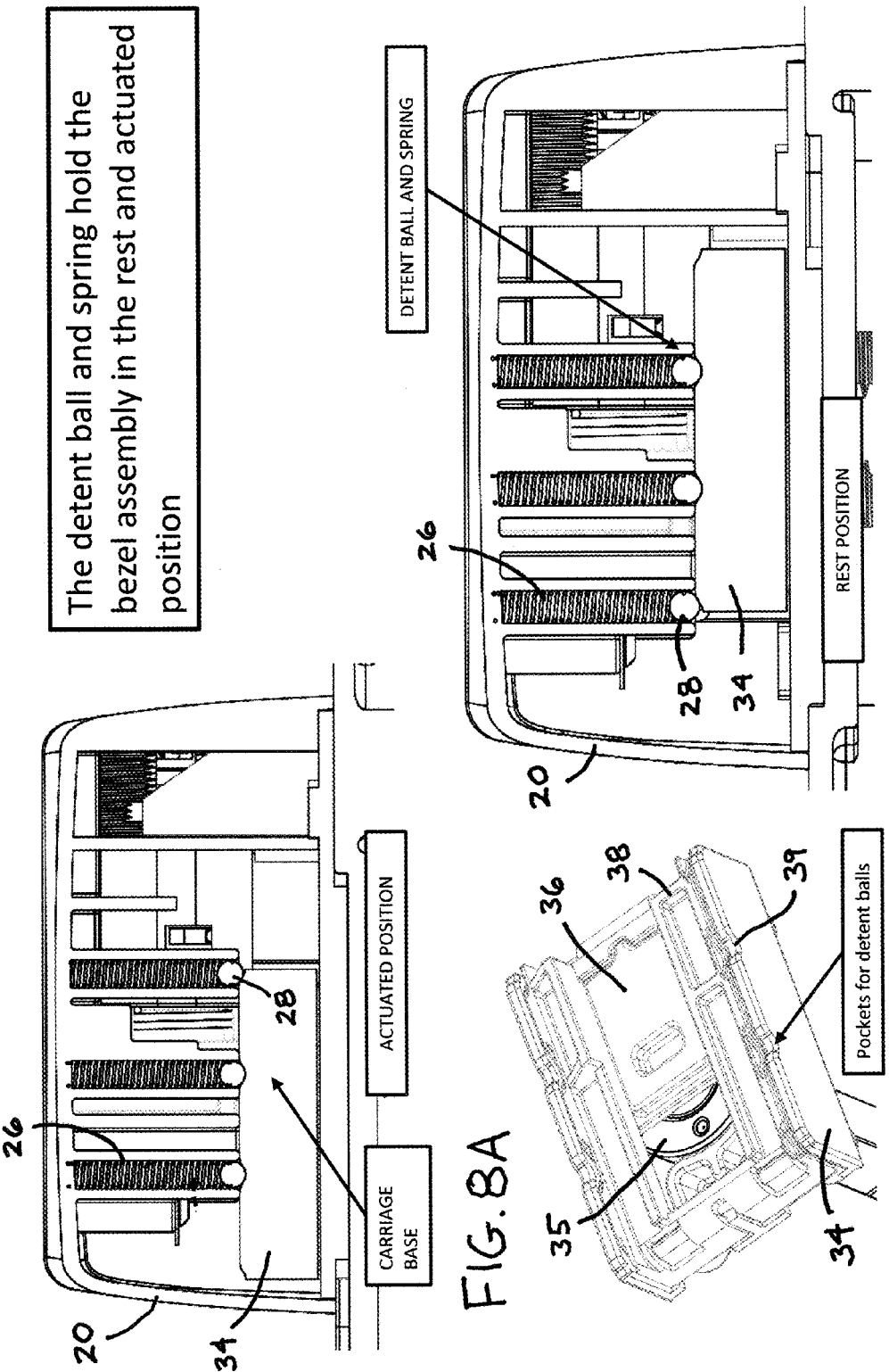

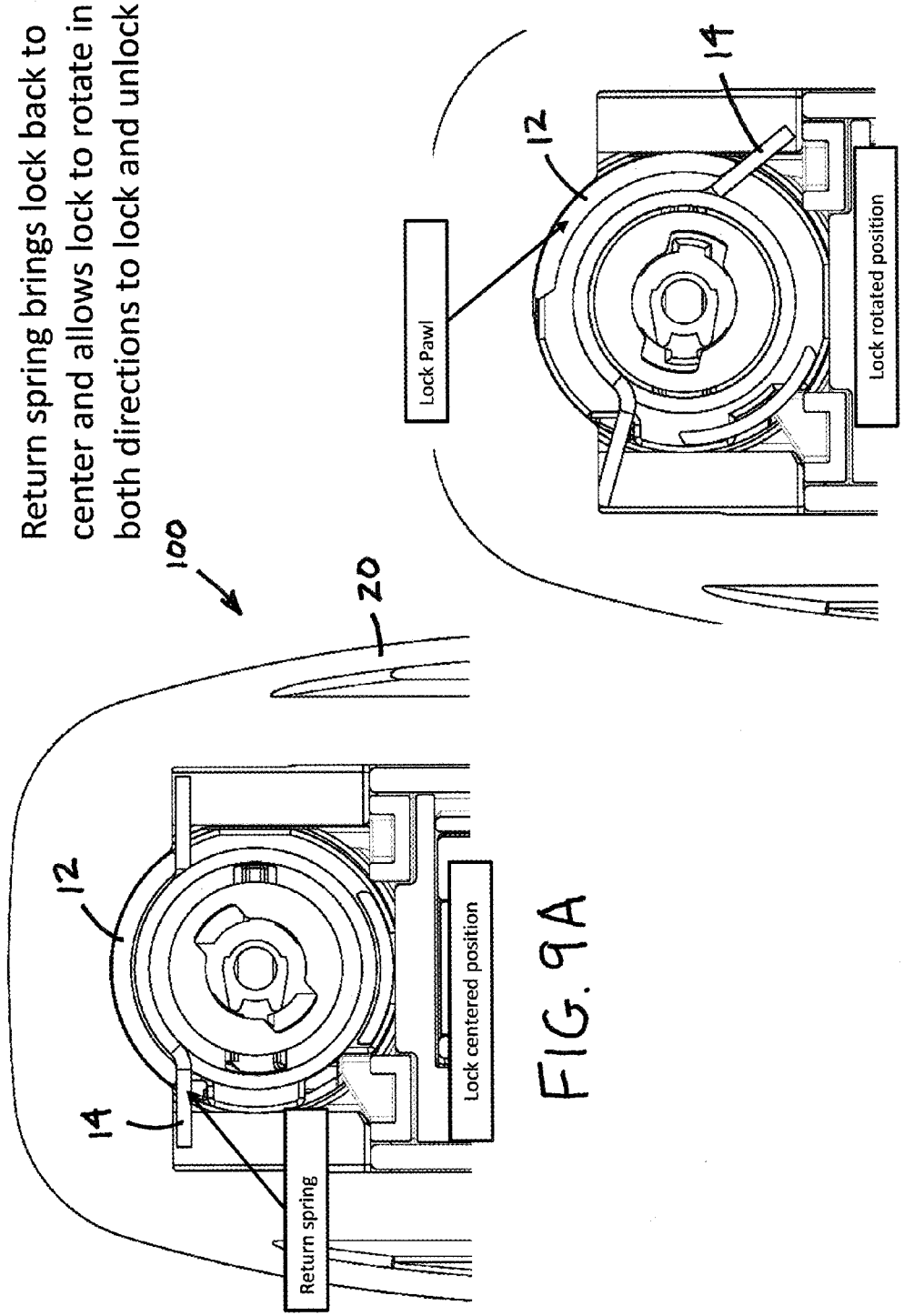

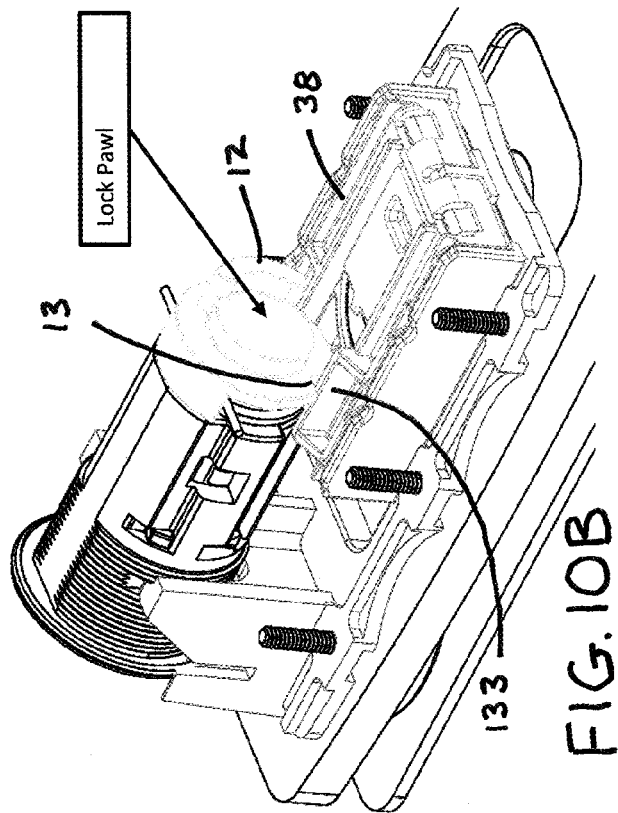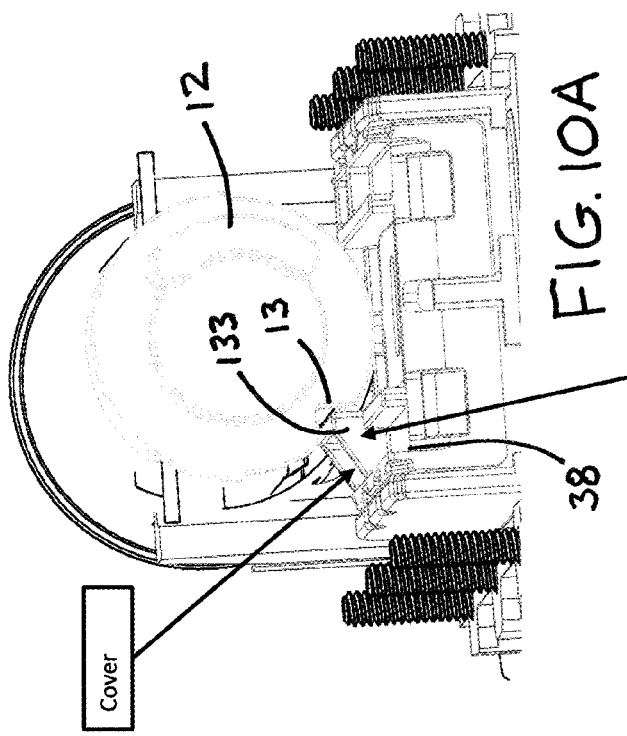

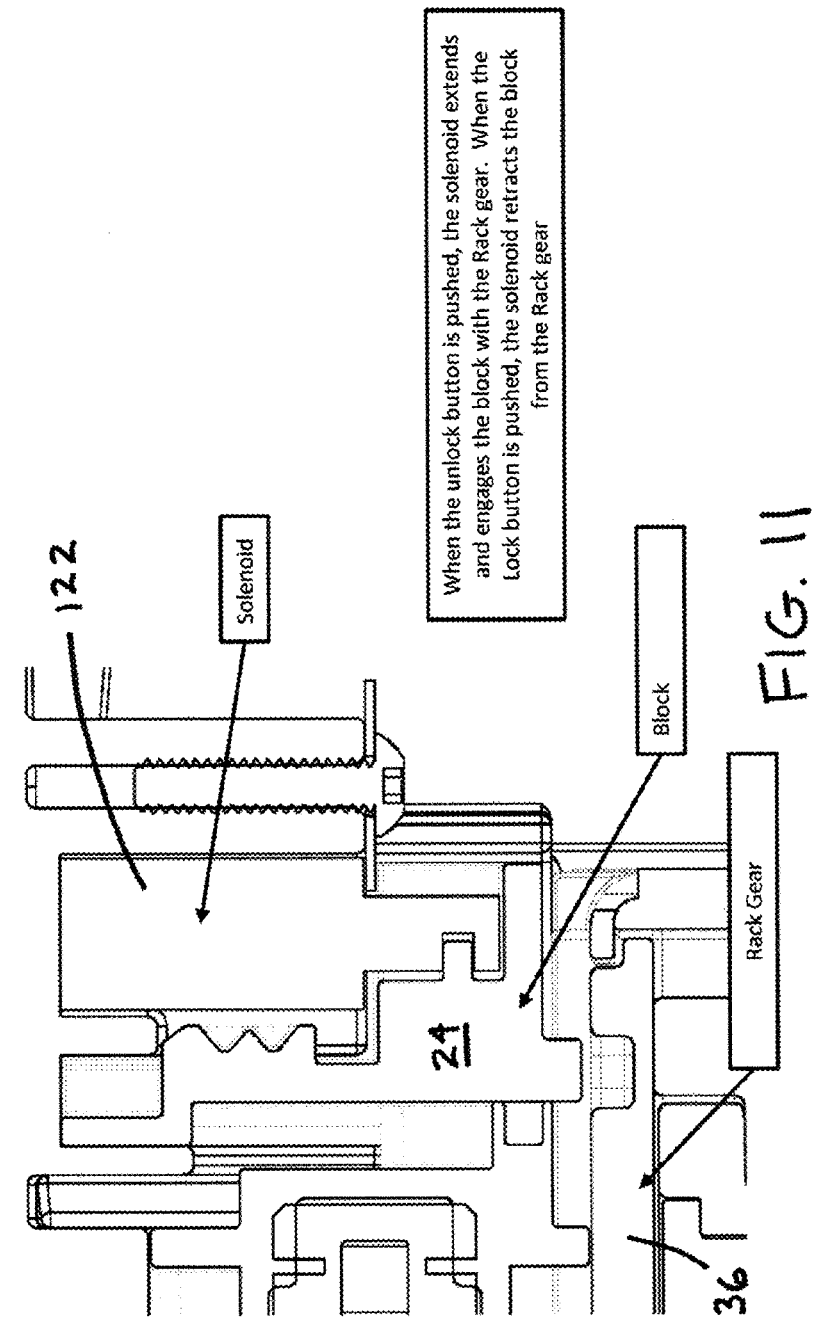

TRUCK CAP HANDLE AND LOCK ASSEMBLY

This Application claims the benefit of U.S. Provisional Application No. 62/069,498, filed Oct. 28, 2014.

FIELD OF THE INVENTION

The present invention relates generally to vehicle caps, including those that are commonly used to cover the bed of a pickup truck. The present invention also relates generally to locks and to other security devices that use locks and locking mechanisms. More specifically, the present invention relates to a truck cap handle and lock assembly that can be used to secure the hinged rear glass access window of a truck bed cap.

BACKGROUND OF THE INVENTION

All pickup trucks have a "bed" that is disposed immediately to the rear of the passenger cabin. This bed comprises side walls, a floor and a lift gate. To prevent access to the contents of the pickup truck bed, many pickup trucks use a truck bed cap which seals the cap to the bed at its sidewalls and lift gate. Access to that portion of a pickup truck that is covered by such a truck bed cap is usually via the hinged rear glass access window of the cap.

To that end, it is well known in the art to incorporate a combined handle and lock assembly into the rear glass access window of the cap. In the applicable art, such handle and lock assemblies typically take the form of a "T-shaped" handle having a lock cylinder disposed within that portion of the handle that is generally positioned in the middle of the window, towards the bottom, the handle being perpendicular to the hinged rear glass access window ("rear window" or "glass access window"). When locked, the T-shaped handle cannot be rotated about its axis. When a key is used to unlock the handle, the handle can be rotated, which releases locking mechanisms to either side of the window and allows the user to pull the handle upwardly and to rotate the rear window upwardly and about its hinges which are typically disposed along the top margin of the access window.

In the view of these inventors, there is a need to provide a simplified truck cap handle and lock assembly that is easier to use and which can also be easily converted to an electronic actuated version when such is desired or required.

SUMMARY OF THE INVENTION

In accordance with the foregoing, the present invention provides a simplified truck cap handle and lock assembly. The present invention provides for a unique locking assembly having a number of components that form such assembly. The assembly is easy to use and easy to install in an aftermarket application. Further, the assembly can be easily converted to an electronic actuated version without any retooling of the component parts of the assembly. The assembly provides the user with tactile feedback as to its operation and improves over the prior art.

The foregoing and other features of the truck cap handle and lock assembly of the present invention will be apparent from the detailed description that follows.

BRIEF DESCRIPTION OF THE DRAWINGS

FIGS. 1A-1D are perspective and front elevation views of the truck cap handle and lock assembly that is constructed in accordance with the present invention.

FIGS. 4A-4D are perspective and elevation views of the subassembly shown in FIG. 3 as assembled.

FIG. 5 is an enlarged and partially sectioned plan view showing a portion of the assembly.

FIGS. 6A and 6B are enlarged and partially sectioned plan views of another portion of the assembly.

FIG. 8A-8C are enlarged partially sectioned elevation and perspective views of another portion of the assembly and showing the detent ball and spring features of the assembly of the present invention.

FIGS. 9A and 9B are partially sectioned side elevational views of the assembly and showing the return spring feature of the assembly.

FIGS. 10A and 10B are additional perspective views of the assembly.

FIG. 11 is a further enlarged and partially sectioned elevation view of a powered version of the assembly wherein the toggle is replaced with a solenoid.

DETAILED DESCRIPTION OF THE INVENTION

Figure 2:
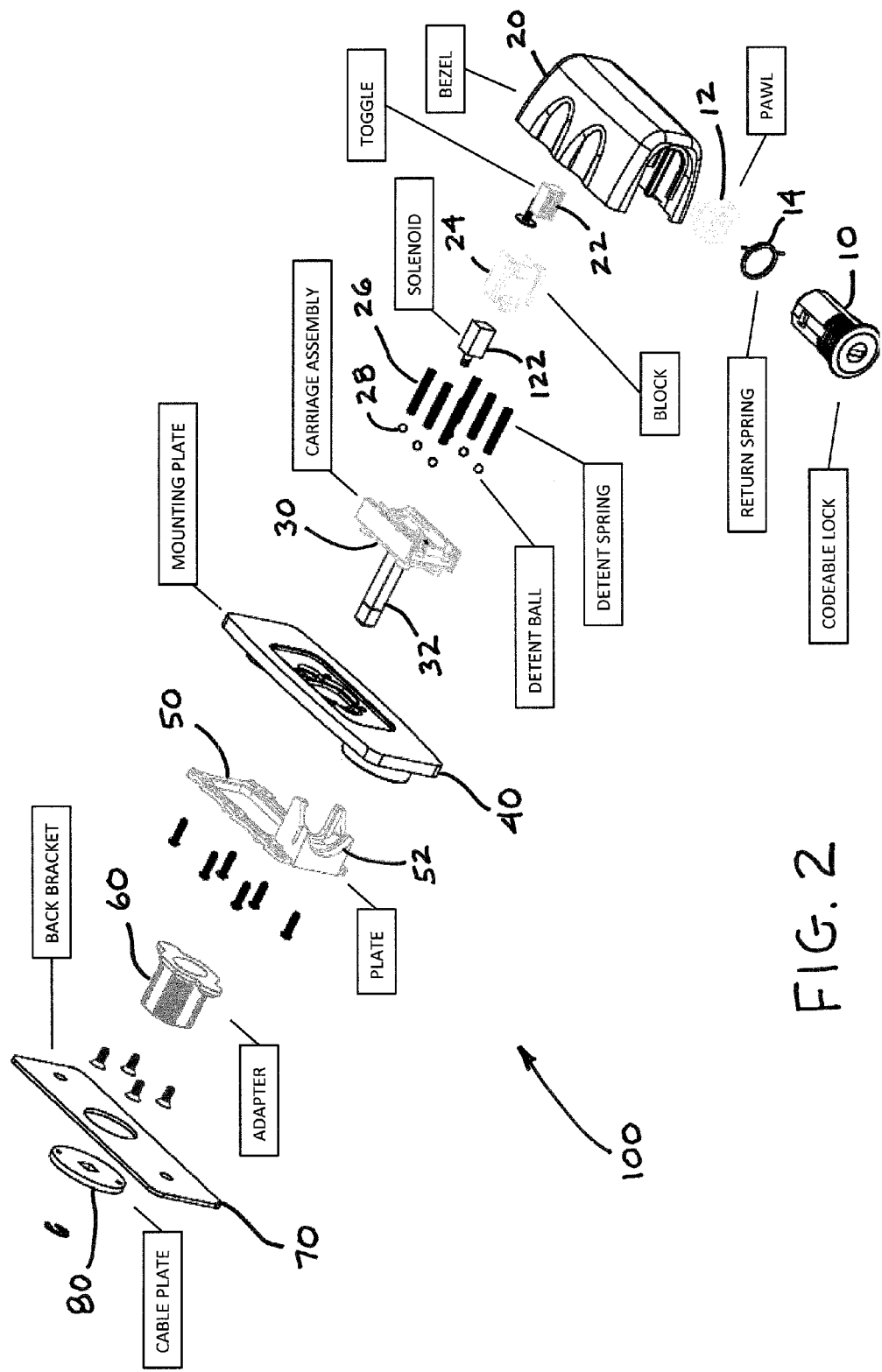
FIG. 2 is an exploded perspective view of the truck cap handle and lock assembly shown in FIGS. 1A-1D.

Referring now to the drawings in detail, FIGS. 1A through 1D show a preferred embodiment of the truck cap handle and lock assembly (alternatively referred to as either the "handle and lock assembly," the "assembly" or the "handle"—all of which are generally identified 100) that is constructed in accordance with the present invention. FIG. 2 is an exploded perspective view of the same assembly 100. Unlike truck cap handle and lock assemblies of the type that are known in the art, the assembly 100 is comprised of a codeable lock 10 that is disposed in a position that is not perpendicular to the plane of the glass access window of the cap. The lock 10 of the present invention comprises an axis that lies in a plane that is parallel to the plane of the glass access window and is rotated 90° from the perpendicular relative to the place of that window. Further, the lock 10 is codeable because it is preferably keyed to match the driver and passenger door locks (not shown) and ignition key switch of the vehicle (also not shown) with which the assembly 100 is used.

Figure 3:
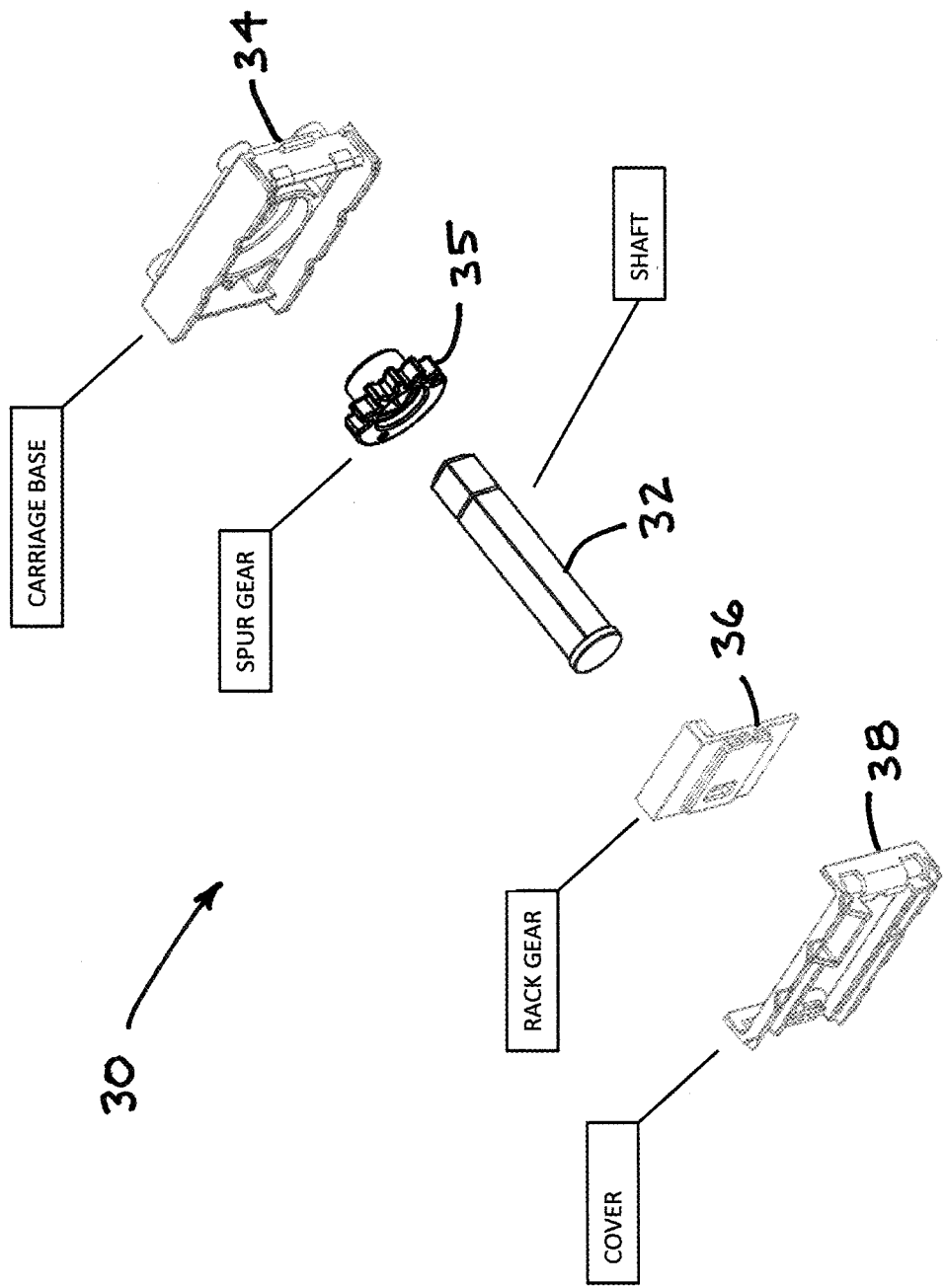
FIG. 3 is an exploded perspective view of the carriage subassembly of the assembly shown in FIG. 2.

In general, the lock 10 is disposed transversely within a bezel 20. The bezel 20 is slidably disposed atop a mounting plate 40 in a plane that is parallel to the plane of the glass access window. The glass of the cap window (not shown) is sandwiched between the mounting plate 40 and a back bracket 70. At the point where the mounting plate 40 and the back bracket 70 "sandwich" the glass, an aperture (not shown) is disposed within the glass. This aperture allows a portion of a carriage subassembly, generally identified 30, and a shaft 32 of the subassembly 30 in particular, to extend through the glass. See FIG. 3. When the handle 100 is unlocked and the bezel 20 is actuated linearly (moving to the right in FIGS. 1C and 1D), it rotates the shaft 32 which, in turn, pulls cables or rods (not shown) that unlatch the cap access window (also not shown) via the cable plate 80.

Referring again to FIG. 2, it will be seen that the codeable lock 10 also includes a pawl 12 and a return spring 14. The lock 10, pawl 12 and spring 14 are nested between the inner side of the bezel 20 and a support member 52 of a plate 50. Disposed between the slidably movable bezel 20 is a toggle 22, a block 24, a plurality of detent springs 26 and a plurality of detent balls 28. A carriage assembly (or, alternatively, "subassembly") 30 includes the previously mentioned shaft 32 which extends rearwardly of the bezel 20, which means that the shaft 32 previously mentioned is instead perpendicular to the window and extends generally in the direction toward the truck cab and cap. A mounting plate 40, a support plate 50 and an adapter 60 are also provided. It should be noted that the toggle 22, which will be discussed in greater detail later in this description, could also be replaced by a solenoid.

Referring again to FIG. 3, it illustrates the structural elements of the carriage subassembly 30 which comprises the shaft 32 as previously mentioned, a carriage base 34, a spur gear 35, a rack gear 36 and a cover 38. As shown in FIGS. 4A through 4D, it will be appreciated that, when the handle 100 is unlocked, a portion of the block 24 engages the rack gear 36. When the bezel 20 is pushed, it drags the rack gear 36 with it, which rotates the spur gear 35 and the shaft 32. Note that this is accomplished by virtue of the linear disposed gear teeth 31 of the rack gear 36 meshing with the arcuately disposed gear teeth 33 of the spur gear 35. The "unactuated" positions of these structural elements are illustrated in FIGS. 4A and 4B. The "actuated" positions are shown in FIGS. 4C and 4D.

Figure 7A:
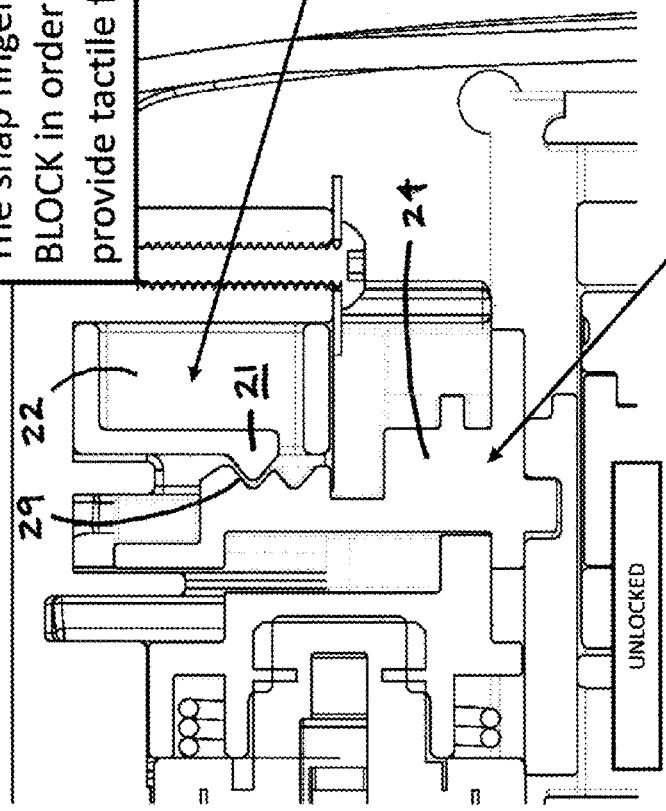
FIGS. 7A and 7B are enlarged and partially sectioned plan views of another portion of the assembly.
Figure 7B:
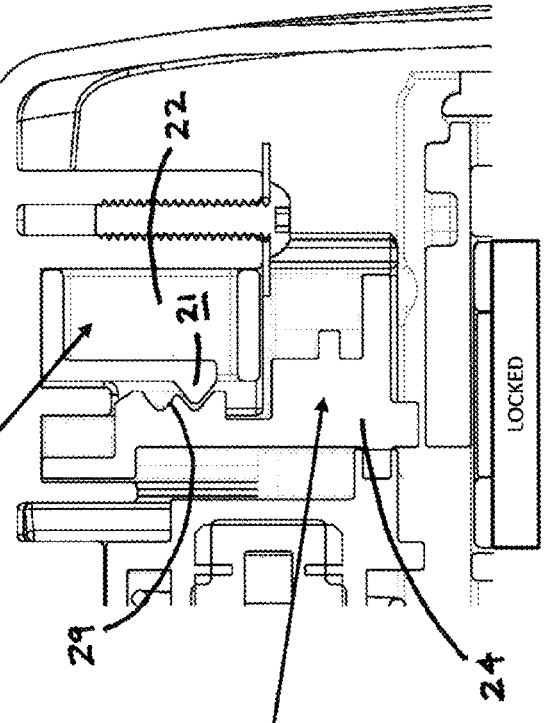

FIG. 5 shows that the portion 23 of the block 24 which engages the rack gear 36 is movable into and out from a corresponding recess 37 in the rack gear 36. As illustrated, the block 24 is not engaged with the rack gear 36, thereby allowing the bezel 20 to move independently of the rack gear 36. As shown in FIGS. 6A and 6B, it will be seen that an arcuate portion of the pawl 12 engages the lock 10 and moves dependently with the lock 10. When the lock 10 is rotated counterclockwise, it drives the block 24 down and engages the rack gear 36. The rack gear 36 and bezel 20 assembly now move dependently. Also during the "locked" and "unlocked" modes of the assembly 100, FIGS. 7A and 7B show that a snap finger 21 of the toggle 22 engages notches 29 in the block 24 in order to hold it in its respective states as well as provide tactile feedback to the user when turning the lock 10. As illustrated, FIG. 7A shows the assembly 100 in the "unlocked" condition whereas FIG. 7B shows the assembly in the "locked" condition.

It is also to be appreciated that, in the "actuated" position, which means when the bezel 20 is urged to the right by the user, the carriage base 34, which comprises several pockets or detents 39, allows the detent springs 26 to force the detent balls 28 into the pockets or detents 39. See FIG. 8A. In the "rest" position, which means when the bezel 20 is returned to its position to the left, the same springs 26 push the balls 28 into one other pocket or detent 39. See FIG. 8C. In the preferred embodiment, three springs 26 and balls 28 are provided, as are four pockets or detents 39. This means that the first and the last pockets or detents 39 are alternatively used or not used, the two middle pockets or detents 39 are always used.

Referring now to FIGS. 9A and 9B, it will be appreciated that the return spring 14 is used to bring the lock 10 back to center and allows the lock 10 to rotate in both directions to "lock" and "unlock." FIG. 9A shows the lock 10 in a centered position whereas FIG. 9B shows the lock in a rotated position.

Lastly, it is important to prevent the user from attempting to lock the handle 100 when it is actuated because it will cause synchronization issues. To prevent this, as is shown in FIGS. 10A and 10B, a notch 13 in the pawl 12 engages a protrusion 133 in the cover 38 when the handle 100 is actuated. This prevents the lock 10 from being rotated at that position. See FIG. 10A in particular. When moved back to the rest position, the protrusion 133 on the cover 138 clears the notch 13 and the lock pawl 12 can be freely rotated.

To make a powered version of the handle 100, the toggle 22 is replaced with a solenoid 122. See FIG. 11. The solenoid signal wires (not shown) can be tapped into the unlock/lock signal wire of the vehicle so that it can be actuated via the vehicle's key fob or the switch in the vehicle. In operation, when the unlock button is pushed, the solenoid 122 extends and engages the block 24 with the rack gear 36. When the lock button is pushed, the solenoid 122 retracts the block 24 from the rack gear 36.

Additional advantages and modifications will readily occur to those skilled in the art. Therefore, the invention in its broader aspects is not limited to the specific details disclosed and described herein. Accordingly, various modifications may be made without departing from the spirit or scope of the general inventive concept.

The details of the invention having been disclosed in accordance with the foregoing, we claim:

1. A truck cap handle and lock assembly that can be used to secure the hinged glass access window of a truck bed cap, the assembly comprising:
    a bezel that is disposed atop a bezel mounting plate, the bezel being functionally adapted to slidably move along the mounting plate and in a plane that is parallel to the glass access window;
    a back bracket, the back bracket and the bezel mounting plate sandwiching a portion of the glass access window of the truck bed cap between them;
    a support plate and adapter, the support plate and the adapter being disposed between the back bracket and the bezel mounting plate;
    a lock, the lock comprising a pawl and a return spring, the lock mounted within the bezel and supported by the support plate;
    a toggle;
    a block;
    a plurality of detent springs and a plurality of detent balls; and
    a carriage subassembly.

2. The truck cap handle and lock assembly of claim 1 wherein the lock is codeable wherein the lock is keyed to match other keys for locks used with the truck.

3. The truck cap handle and lock assembly of claim 1 wherein the lock is disposed transversely within the bezel.

4. The truck cap handle and lock assembly of claim 1 wherein the carriage subassembly further comprises:
    a shaft that is perpendicular to the lock and to the bezel;
    a carriage base;
    a spur gear;
    a rack gear; and
    a cover;
    wherein the block engages the rack gear such that, when the bezel slides, the bezel drags the rack gear with the bezel which rotates the spur gear and the shaft.

5. The truck cap handle and lock assembly of claim 4 wherein the rack gear comprises linear disposed gear teeth and the spur gear comprises arcuately disposed gear teeth, the gear teeth of the rack gear meshing with the gear teeth of the spur gear.

6. The truck cap handle and lock assembly of claim 5 wherein a portion of the block that engages the rack gear is movable into and out from a corresponding recess in the rack gear.

7. The truck cap handle and lock assembly of claim 6 wherein the toggle comprises a snap finger that engages notches in the block to hold the block in a locked position and alternatively in an unlocked position.

8. The truck cap handle and lock assembly of claim 7 wherein the pawl engages a protrusion in a cover and alternatively clears a notch such that the lock pawl is freely rotated.

9. The truck cap handle and lock assembly of claim 1 wherein the toggle comprises a solenoid.

10. The truck cap handle and lock assembly of claim 5 wherein the toggle comprises a solenoid and wherein the solenoid extends and engages the block with the rack gear and alternatively retracts the block from the rack gear.

11. A truck cap handle and lock assembly comprising:
a bezel mounting plate;
a bezel that is disposed atop the bezel mounting plate wherein the bezel is slidably moveable along the bezel mounting plate;
a back bracket;
a support plate and adapter, the support plate and the adapter being disposed between the back bracket and the bezel mounting plate;
a lock, the lock comprising a pawl and a return spring, the lock being mounted within the bezel and the lock further being supported by the support plate and being disposed transversely within the bezel;
a toggle;
a block;
a plurality of detent springs and a plurality of detent balls; and
a carriage subassembly comprising:
a shaft that extends rearwardly of the bezel;
a carriage base;
a spur gear;
a rack gear; and
a cover;
wherein the block engages the rack gear such that, when the bezel slides, the bezel drags the rack gear with the bezel which rotates the spur gear and the shaft.

12. The truck cap handle and lock assembly of claim 11 wherein the rack gear comprises linear disposed gear teeth and the spur gear comprises arcuately disposed gear teeth, the gear teeth of the rack gear meshing with the gear teeth of the spur gear.

13. The truck cap handle and lock assembly of claim 12 wherein a portion of the block that engages the rack gear is movable into and out from a corresponding recess in the rack gear.

14. The truck cap handle and lock assembly of claim 13 wherein the toggle comprises a snap finger that engages notches in the block to hold the block in a locked position and alternatively in an unlocked position.

15. The truck cap handle and lock assembly of claim 11 wherein the pawl engages a protrusion in a cover and alternatively clears a notch such that the lock pawl is freely rotated.

16. The truck cap handle and lock assembly of claim 11 wherein the toggle comprises a solenoid and wherein the solenoid extends and engages the block with the rack gear and alternatively retracts the block from the rack gear.

17. The truck cap handle and lock assembly of claim 11 wherein the lock is codeable wherein the lock is keyed to match other keys for locks used with the truck.

* * * * *